324-7
CROSS REFERENCE
SEARCH ROOM

June 15, 1965 R. V. LOWMAN 3,189,820

PLURAL CHANNEL SIGNAL RECEIVER INCLUDING SIGNAL DELAY MEANS

Filed April 26, 1961 2 Sheets-Sheet 1

INVENTOR
RODERIC V. LOWMAN
BY Dennis Edwards
Morton Bernard & Taylor
ATTORNEYS

INVENTOR
RODERIC V. LOWMAN
BY Pennie Edmonds
Morton Barrows & Taylor
ATTORNEYS

United States Patent Office
3,189,820
Patented June 15, 1965

3,189,820

PLURAL CHANNEL SIGNAL RECEIVER INCLUDING SIGNAL DELAY MEANS

Roderic V. Lowman, Greenlawn, N.Y., assignor to Cutler-Hammer, Inc., Milwaukee, Wis., a corporation of Delaware Filed Apr. 26, 1961, Ser. No. 105,800
11 Claims. (Cl. 324—82)

This invention relates to electrical signal frequency measuring apparatus, and particularly to a signal receiver adapted to continuously monitor a broad-band frequency spectrum and localize an input signal in one of a plurality of narrower frequency channels within the broad band.

The apparatus provided by the present invention is particularly well suited for broad-band radio-frequency monitoring systems, but the invention may be applied to other portions of the frequency spectrum if desired. Inas much as the invention is particularly advantageous in monitoring and localizing signals at microwave frequencies, the embodiments of the invention described hereinafter illustrate that field of application.

Different types of monitoring receivers are known in the art. In some types a broad band is periodically swept so that a given portion of the band is monitored only discontinuously. In others, continuous monitoring of all portions of the broad band is possible, but the receiver may become quite complicated and expensive when it is desired to ascertain the frequency of a particular received signal.

It is a principal object of the present invention to provide a relatively simple and inexpensive automatic frequency channelizer which continuously monitors a broad-band frequency spectrum and automatically localizes an incoming signal within a narrow region of the broad band.

In accordance with the invention, a plurality of multiple pass-band coding channels are provided, and input signals within the selected broad band supplied thereto. One coding channel has a selected plurality of frequency channels within the broad band. Successive coding channels have a plurality of sets of frequency channels spaced over the broad band, with the channels of one set lying between the channels of another. Successive coding channels have successively increasing numbers of narrower frequency channels in the sets thereof.

Means are provided in each coding channel to produce a distinctive output when an input signal is present in one set of channels thereof. Thus the distinctive outputs of the plurality of coding channels localize the frequency of the input signal to a successively narrower frequency channel. Advantageously the outputs of the coding channels are combined in a binary manner to give a binary indication of the frequency of the input signal.

In the specific embodiments hereinafter described, the first coding channel is designed so that the selected broad band is divided into two frequency channels whose outputs correspond to the binary "1" or "0," respectively. The second coding channel is divided into four narrower frequency channels alternately corresponding to the binary "1" and "0." Succeeding coding channels are divided into 8, 16, etc. narrower frequency channels alternately corresponding to "1" and "0." In general, the number of frequency channels increases in integral powers of 2 from coding channel to channel.

By increasing the number of coding channels in this manner, an input signal may be localized with any desired accuracy. For example, with four coding channels an input signal can be localized within a frequency channel $1/16$ as wide as the input bandwidth. With seven coding channels, it can be localized within $1/128$ of the input signal bandwidth.

The division of the input signal band into the selected number of narrower frequency channels in each coding channel may be accomplished by the use of comb filters or multiple pass-band filters having alternate pass and reject bands. Preferably a pair of comb filters is employed in each coding channel with the pass bands of one lying in the reject bands of the other, and the outputs amplitude-compared to determine which is larger. A larger output of one comb filter may be assigned the binary 1 and a larger output of the other the binary 0.

Advantageously, in accordance with a further feature of the invention, the frequency channels are established by the use of delay lines of appropriate length, with the delayed signals combined with the input signal to obtain sum and difference signals. These signals will have alternate pass and reject bands with the pass bands of the sum signal lying between the pass bands of the difference signal. The amplitudes of the sum and difference signals are then compared, and a binary 1 or 0 produced depending upon which is larger.

The invention will be further described in connection with specific embodiments thereof.

Figures 1, 3:
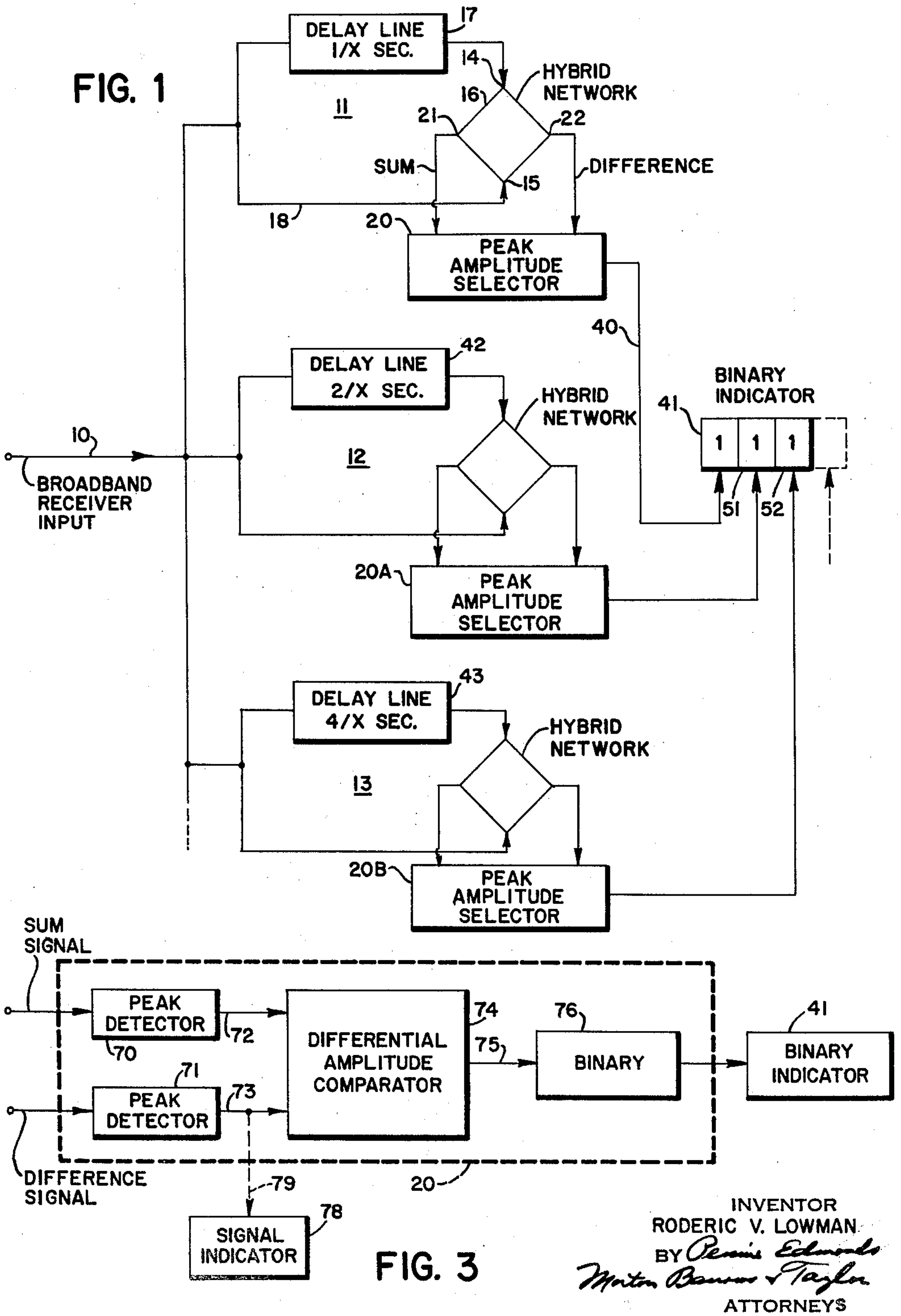
FIG. 1 is a diagram of a frequency channelizer in accordance with the invention utilizing individual delay lines in the coding channels.
FIG. 3 is a diagram showing a suitable peak amplitude selector for use in FIG. 1.

Referring now to FIG. 1, a broad-band microwave frequency channelizer is shown. An input signal in a selected broad band is supplied from a suitable broad-band microwave receiver (not shown) to the channelizer via transmission line 10 which may take the form of a waveguide, coaxial line, strip transmission line, etc. The input signal is supplied to a plurality of coding channels 11, 12, 13, etc. As shown, each coding channel contains a delay line and the delays in successive coding channels increase as integral powers of 2.

Describing first the coding channel 11, the bandwidth within which signals are to be received is denoted $x$ (cycles per second). The bandwidth $x$ may be, for example, several hundred megacycles wide at frequencies of several thousand megacycles. The delay provided by line 17 is $1/x$ seconds, as indicated. The delayed signal and the undelayed signal in line 18 are combined additively and subtractively to form sum and difference signals. As shown, this is accomplished by a microwave hybrid network which may be of conventional form. The delayed and undelayed signals are supplied to opposite input ports 14 and 15 of the hybrid network, and the sum and difference signals are obtained from ports 21 and 22, respectively. The latter signals are supplied to a circuit for determining which is of greater amplitude, here shown as a peak amplitude selector 20.

Figure 2A:
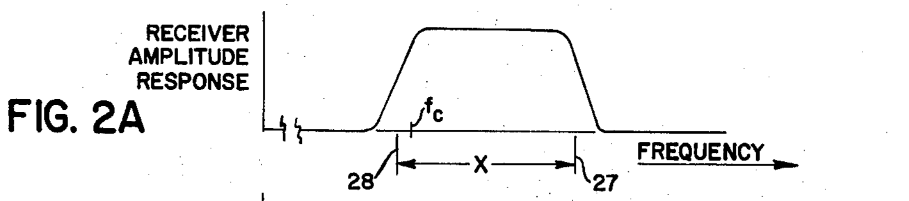
FIGS. 2A–2D are graphical representations illustrating the operation of FIG. 1.
Figure 2B:
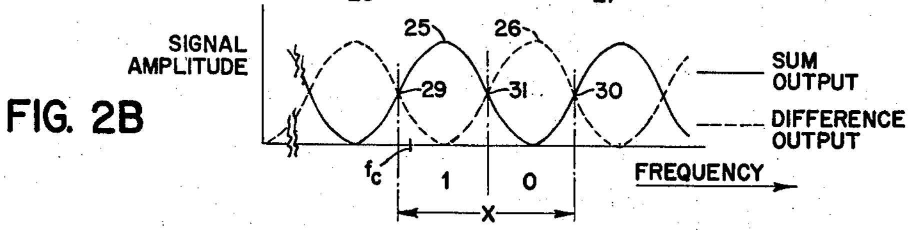

FIGS. 2A and 2B illustrate the operation of the apparatus so far described. FIG. 2A shows an illustrative receiver amplitude response with the bandwidth denoted $x$. FIG. 2B shows the sum and difference curves 25 and 26. With a delay of $1/x$ seconds, a frequency at the top of band $x$, corresponding to line 27, will be delayed one more cycle than a frequency at the lower end of the band, indicated by line 28. A frequency within these limits will be delayed by various amounts less than one cycle with respect to the delay of the lowest frequency. Consequently, a pair of RF interference patterns will be produced at the sum and difference outputs of the hybrid network, as indicated by lines 25 and 26.

If the input signal is denoted $E_i$ and the sum signal $E_s$, analysis gives the following equation:

$$|E_s|^2=\frac{E_i^2}{2}(1+\cos \omega T) \quad (1)$$

Here $|E_s|$ represents the magnitude of the sum signal, $\omega$ equals $2\pi f$ where $f$ is the signal frequency, and T is the delay time.

Similarly, the difference signal $E_d$ can be represented by the following equation:

$$|E_d|^2=\frac{E_i^2}{2}(1-\cos \omega T) \quad (2)$$

By assigning values for $\omega$ equal to 0, $\omega/T$, $2\omega/T$, etc., it will be seen that the sum output has a peak value equal to the input signal for values of $\omega$ equal to 0, $2\pi/T$, etc., or in general for even multiples of $2\pi/T$. On the other hand, the difference output signal will be 180° out of phase with the sum output, and the peaks of the difference signal will correspond to the valleys of the sum signal, and vice versa. Further, the curves will cross over at their half amplitude (−3 db) points, and these crossover points will occur when $\omega$ is equal to odd multiples of $\pi/2T$.

With $T=1/x$, as assumed for delay line 17, the frequency separation of like crossover points 29 and 30 in FIG. 2B will be $x$, as shown. A crossover in the opposite direction will be midway therebetween as shown at 31.

Although the analysis assumes that the delay line is capable of functioning down to zero frequency, it will be understood that in a particular application it need only be sufficient to cover the desired receiver band.

From FIG. 2B it will be noted that the sum output exceeds the difference output in the lower half of the band $x$, and the difference output is greater in the upper half of band $x$. These two regions are assigned the binary numbers "1" and "0," respectively. The peak amplitude selector 20 of FIG. 1 is adapted to differentially compare the amplitudes of the sum and difference output signals and produce a corresponding "1" or "0" binary output in line 40. Thus two frequency channels are provided, and a distinctive output is produced indicating whether the input signal is in one or the other channel.

The output in line 40 is supplied to section 41 of a binary indicator, and a "1" or "0" will appear in section 41 depending on the frequency of the input signal.

In FIG. 2B the desired receiver band starts at a frequency corresponding to crossover 29 and ends at a frequency corresponding to crossover 30. The frequencies at the crossover points are related to the delay time T as discussed above. Accordingly, in a particular application a delay time can be selected such that the desired receiver band lies between adjacent like crossover points, and the effective receiver bandwidth confined to that region.

Figure 2C:
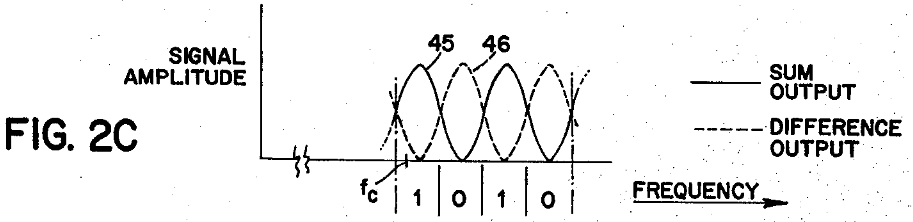

Coding channel 12 is similar to channel 11, except that delay line 42 provides twice the delay of 17. This results in twice as many frequency channels within the selected broad band. FIG. 2C illustrates the sum and difference outputs for channel 12. It will be noted that the sum output 45 has two peaks within the passband, and the difference output 46 has two peaks alternating with those of the sum output. Consequently there are two frequency channels denoted by the binary "1" wherein the sum output exceeds the difference, and two frequency channels denoted by the binary "0" wherein the difference output exceeds the sum. Accordingly there are two sets of frequency channels corresponding to "1" and "0," respectively, with two frequency channels in each set.

Peak amplitude selector 20A determines whether the sum or difference signal is greater, and supplies a corresponding binary signal to section 51 of the binary indicator.

Figure 2D:
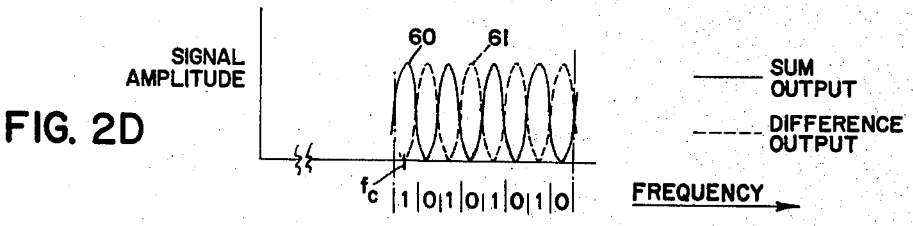

Coding channel 13 is similar to 12, except that the delay line 43 has twice the delay of line 42, and four times the delay of line 17. As shown in FIG. 2D, this results in two sets of frequency channels denoted by the binary "1" and "0," respectively, with four frequency channels in each set. Each frequency channel is half the width of that of FIG. 2C and one-quarter the width of that of 2B. Peak amplitude selector 20B supplies a corresponding binary signal to section 52 of the indicator.

Additional coding channels may be provided as indicated by the dotted lines in FIG. 1, each containing a delay line providing twice the delay of the line in the preceding coding channel. Thus the delay and number of frequency channels increase as integral powers of 2 in successive coding channels. In this manner any desired resolution of input signal frequency may be obtained.

To illustrate the operation, assume that an input signal $f_c$ arrives as indicated in FIG. 2A. This will result in a binary "1" from coding channel 11, a "1" from channel 12 and a "1" from channel 13. Thus the indication on the binary indicator of FIG. 1 will be as shown. For a slight increase in frequency a "1" might still be obtained from coding channels 11 and 12 but a "0" from channel 13, thus indicating that it has a somewhat higher frequency. As the frequency of the input signal increases within broad band $x$, the binary code will change accordingly and will uniquely locate the input signal to an accuracy determined by the narrowest frequency channel.

It will be noted that the sum output signal in each channel has alternate peaks and valleys representing pass and reject bands, and consequently is a type of comb filter. Similarly, the difference output signal is a comb filter with the pass bands lying in the reject bands of the sum comb filter and vice versa. The skirts of the individual pass bands are not sharply defined. However, by supplying the sum and difference signals to an amplitude selector to determine which has greater amplitude, the individual frequency channels have sharply defined boundaries. Further, the differential comparison renders the coding channels far less sensitive to changes in input signal strength.

Other types of comb filters may be used in the coding channels. Advantageously a pair of comb filters is employed in each channel with the pass bands of one filter lying in the reject bands of the other, and amplitude selection employed to determine which output is greater.

A given input signal may be modulated, or otherwise changing in amplitude. Consequently, it is desirable to compare peak amplitudes of the signal as fed from the sum and difference outputs of the hybrid networks to the corresponding amplitude selectors.

FIG. 3 illustrates a peak amplitude selector which may be employed in the embodiment of FIG. 1. A selector for coding channel 11 is particularly illustrated, and those for the channels 12, 13, etc. may be similar.

The sum and difference signals from the hybrid network are applied to respective peak detectors 70 and 71, and the detector outputs are supplied through lines 72, 73 to a differential amplitude comparator 74. Consequently, an output will be obtained in line 75 depending on which of the sum and difference signals is greater. The signal in line 75 is supplied to a binary multivibrator or flip-flop 76 which delivers corresponding outputs to the binary indicator section 41. Advantageously binary 76 is normally in a "0" state and is switched to its "1" state whenever the output of comparator 75 indicates that the sum signal is greater than the difference signal. For the reverse condition, binary 76 returns to its "0" state. If necessary, in order to avoid false operation due to intelligence modulation of the input signals, the signal from comparator 74 to binary 76 may be integrated a suitable length of time. Suitable circuits for the individual components of FIG. 3 are well known in the art.

It will be noted from FIGS. 2A–2D that if an input signal lies near the top of band $x$ in the region of line 27, all coding channels will give a "0" output. This would also be true if no signal were being received, and consequently an ambiguity may arise. This may be avoided by somewhat restricting the input signal bandwidth so that the 0, 0, 0, etc. indication is not used. Or, a signal indicator 78 may be connected through line 79 to line 73. Thus, if indicator 78 shows the presence of a signal, and the binary indicator of FIG. 1 reads all 0's, it will be known that a signal is present in the highest channel of the channelizer. Only a single indicator in any one of the coding channels is required, and hence line 79 is shown dotted.

Figure 4:
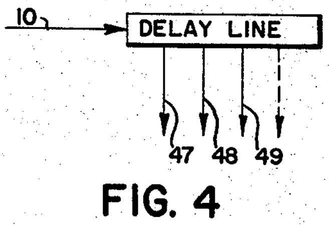
FIG. 4 illustrates a tapped delay line which may be used in place of individual lines in FIG. 1.

Instead of using several delay lines as shown in FIG. 1, a single delay line tapped at suitable intervals to provide the desired delays may be employed. This is illustrated in FIG. 4. Tapped lines 47, 48, 49, etc. may be connected to the hybrid networks of respective coding channels. If necessary, isolators may be employed between each tap and the corresponding hybrid network.

Figure 5:
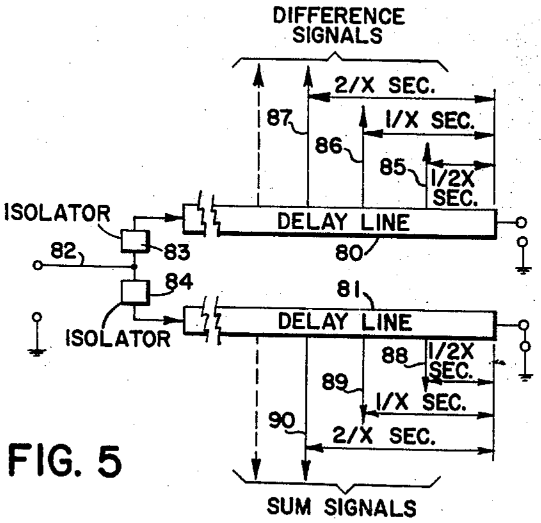
FIG. 5 shows an alternative delay line arrangement using a pair of tapped delay lines.

FIG. 5 shows an alternative delay line arrangement for producing the multiple band-pass characteristics of FIGS. 2B–2D. Here, in effect, in each coding channel two delay lines with different terminations are employed to give the sum and difference signals, rather than employing a single delay line with a hybrid network.

The incoming signal from a broad-band receiver is simultaneously applied to tapped delay lines 80 and 81 via transmission line 82 and isolators 83, 84, respectively. Isolators 83, 84 are advantageously of the passive low loss ferrite type. However, attenuators or active amplifier stages may be employed where desired.

Both delay lines are tapped at distances from the terminal ends of the lines which provide time delays of $1/2x$, $1/x$, $2/x$, etc. seconds, as indicated. It will be noted that these one-way delays are one-half the corresponding delays of the delay lines in FIG. 1. However, a signal passing down each delay line will be reflected at the end, and consequently the delay between initial and reflected signals at any given tap will be twice the one-way delay, thus giving overall delays as shown in FIG. 1.

Delay line 80 is terminated in an open circuit, and consequently the reflected signal is reversed in polarity. Therefore, the initial and reflected signals at a given tap, say 85, represent a difference signal. Accordingly the signals appearing at the various taps 85, 86, 87, etc. represent differences between the incoming signal and the signal after respective delays, and yield resultant difference output signals as shown in FIGS. 2B–2D.

Delay line 81 is terminated in a short circuit, and consequently there will be no reversal in polarity of the reflected signals. Accordingly, the resultant signals at the several taps 88, 89 and 90 will be sum output signals as shown in FIGS. 2B–2D.

Corresponding sum and difference signals may be supplied to respective amplitude selectors, as described in connection with FIGS. 1 and 3. To avoid appreciably loading the delay lines at the various tapping points, the amplitude selectors may be arranged to have a sufficiently high input impedance or isolators provided. In lieu of tapped delay lines, as shown in FIG. 5, individual pairs of delay lines may be employed in each coding channel.

Many changes may be made in the specific embodiments described. The assignment of "1" and "0" to the coding channels may be reversed. Codes other than binary may be used if desired, with an appropriate selection of the number of frequency channels and sets of channels in the coding channels. Detailed circuit components may be employed to meet the conditions of the particular application. These and other changes may be made within the spirit and scope of the invention.

I claim:

1. In a broad-band signal receiver, apparatus for localizing an input signal in one of a plurality of frequency channels of said broad band which comprises a plurality of coding channels supplied with input signals, one of said coding channels having a plurality of frequency channels within said broad band, the other coding channels having a plurality of sets of frequency channels spaced over said broad band with the channels of one set lying between the channels of another set, different of said other coding channels having a successively increasing number of narrower frequency channels in the sets thereof, means in said one coding channel for producing a distinctive output when an input signal is present in one frequency channel thereof, means in said other coding channels for producing respective distinctive outputs when an input signal is present in one set of channels thereof, and indicating means responsive to said distinctive outputs for localizing an input signal within the corresponding narrowest frequency channel of said sets of channels.

2. In a broad-band signal receiver, apparatus for localizing an input signal in one of a plurality of frequency channels of said broad band which comprises a plurality of coding channels supplied with input signals, one of said coding channels having a plurality of frequency channels within said broad band, the other coding channels having a plurality of sets of frequency channels spaced over said broad band with the channels of one set lying between the channels of another set, different of said other coding channels having a successively increasing number of narrower frequency channels in the sets thereof, means in said one coding channel for producing respective distinctive outputs when an input signal is present in respective frequency channels thereof, means in each of said other coding channels for producing respective distinctive outputs when an input signal is present in respective sets of frequency channels thereof, and indicating means responsive to said distinctive outputs for localizing an input signal within the corresponding narrowest frequency channel of said sets of channels.

3. In a broad-band signal receiver, apparatus for localizing an input signal in one of a plurality of frequency channels of said broad band which comprises a plurality of coding channels supplied with input signals, means in one of said coding channels for dividing said broad band into two adjacent frequency channels, means in the other coding channels for dividing said broad band into two sets of frequency channels with the channels of one set lying between the channels of the other set in substantially contiguous relationship, the number of channels in said sets of channels increasing substantially as integral powers of 2 in respective coding channels and the bandwidth of the channels in the sets being correspondingly narrower, means in said one coding channel for producing respective distinctive outputs when an input signal is present in respective frequency channels thereof, means in each of said other coding channels for producing respective distinctive outputs when an input signal is present in respective sets of frequency channels thereof, and indicating means responsive to said distinctive outputs for localizing an input signal within the corresponding narrowest frequency channel of said sets of channels.

4. In a broad-band signal receiver, apparatus for localizing an input signal in one of a plurality of frequency channels of said broad band which comprises a plurality of coding channels supplied with input signals, means in one of said coding channels for dividing said broad band into two adjacent frequency channels, means in the other coding channels for dividing said broad band into two sets of frequency channels with the channels of one set lying between the channels of the other set in substantially contiguous relationship, the number of channels in said sets of channels increasing substantially as integral powers of 2 in respective coding channels and the bandwidth of the channels in the sets being correspondingly narrower, means in said one coding channel for producing respective distinctive outputs corresponding to a binary 0 or 1 when an input signal is present in respective frequency channels thereof, means in each of said other coding channels for producing respective distinctive outputs corresponding to a binary 0 or 1 when an input signal is present in respective sets of frequency channels thereof, and binary indicating means responsive to said distinctive outputs for localizing an input signal within the corresponding narrowest frequency channel of said sets of channels in accordance with a binary code.

5. In a broad-band signal receiver, apparatus for localizing an input signal in one of a plurality of frequency channels of said broad band which comprises a plurality of coding channels supplied with input signals, each of said coding channels having a pair of filters with pass and reject bands within a predetermined bandwidth, each pass-band of one filter of a pair substantially coinciding with a reject band of the other filter of that pair, the number of said bands within the predetermined bandwidth increasing in successive coding channels, means for comparing the amplitudes of the outputs of the filters of each pair to produce a distinctive signal depending on which is greater, and indicating means utilizing the distinctive signals from the coding channels for localizing an input signal within the corresponding narrowest frequency band of said coding channels.

6. Apparatus in accordance with claim 5 in which said number of bands increase substantially as integral powers of 2 in successive coding channels and the distinctive signal from each coding channel represents a binary 0 or 1, and said indicating means indicates the location of the input signal frequency in accordance with a binary code.

7. In a broad-band signal receiver, apparatus for localizing an input signal in one of a plurality of frequency channels of said broad band which comprises a plurality of coding channels supplied with input signals, delay line means for producing predetermined delays of a signal in the coding channels respectively, means for combining an input signal in each coding channel with a corresponding delayed signal to produce resultant sum and difference signals, the delay between the signals combined in each coding channel being predetermined to increase substantially as integral powers of 2 in successive channels, means for amplitude comparing the sum and difference signals in each coding channel to produce distinctive signals depending on which is greater, and indicating means responsive to the distinctive signals from the coding channels.

8. Apparatus in accordance with claim 7 in which said distinctive signals represent binary digits 0 and 1, respectively, and said indicating means indicates the location of the input signal frequency in accordance with a binary code.

9. In a broad-band signal receiver having an effective frequency bandwidth $x$, apparatus for localizing an input signal in one of a plurality of frequency channels within said bandwidth $x$ which comprises a plurality of coding channels supplied with input signals, delay line means for producing predetermined delays of a signal in the coding channels respectively, means for combining an input signal in each coding channel with a corresponding delayed signal to produce resultant sum and difference signals, means for amplitude comparing the sum and difference signals in each coding channel to produce distinctive signals representing binary digits 0 or 1 depending on which of the sum and difference signals is greater, the delay between the signals combined in a first coding channel being not greater than substantially $1/x$ and predetermined so that the frequency bandwidth $x$ lies between successive like crossovers of the sum and difference amplitude-frequency characteristics, the delay between the signals combined in the other coding channels increasing substantially as integral powers of 2 in successive channels, whereby a distinctive signal from the first coding channel localizes an input signal to an upper or lower frequency channel substantially one-half the frequency separation of said like crossovers and distinctive signals from successive channels localize the input signal to a set of successively narrower frequency channels, and binary indicating means supplied with said distinctive signals for localizing an input signal within the corresponding narrowest frequency channel of said coding channels.

10. In a broad-band signal receiver, apparatus for localizing an input signal in one of a plurality of frequency channels of said broad band which comprises a plurality of coding channels supplied with input signals, a pair of delay lines effective in each of the coding channels, said pair of delay lines being terminated in substantially open and short circuits respectively, a pair of output connections from the delay lines spaced from the respective terminated ends to produce sum and difference signals from the input signal and corresponding delayed reflected signals, the delays effective in said coding channels increasing substantially as integral powers of 2 in successive channels, means for amplitude comparing the sum and difference signals in each coding channel to produce distinctive signals representing binary digits 0 or 1 depending on which of the sum and difference signals is greater, and binary indicating means responsive to the distinctive signals from the coding channels for indicating an input signal frequency.

11. Apparatus in accordance with claim 10 in which a single pair of delay lines provides a plurality of said pairs of delay lines effective in a plurality of coding channels, said single pair of delay lines having a plurality of pairs of taps at different correlated distances from the terminated ends thereof to provide a plurality of pairs of sum and difference signals, said pairs of taps being connected to the amplitude comparing means in the corresponding coding channels respectively.

References Cited by the Examiner

UNITED STATES PATENTS

| | | | |
|---|---|---|---|
| 2,480,128 | 8/49 | Frum | 324—78 X |
| 2,580,148 | 12/51 | Wirkler. | |
| 2,996,613 | 8/61 | Glomb | 324—77 X |
| 3,003,107 | 10/61 | Charbonnier | 324—82 X |

OTHER REFERENCES

"A Multichannel Noise Spectrum Analyzer for 10–10,000 C.P.S.," article in Review of Scientific Instruments, September 1954, pages 899–901.

WALTER L. CARLSON, *Primary Examiner.*

LLOYD McCOLLUM, *Examiner.*